(12) United States Patent
Yu et al.

(10) Patent No.: US 11,657,958 B2
(45) Date of Patent: May 23, 2023

(54) COIL MODULE AND WIRELESS POWER TRANSMITTING CIRCUIT USING THE SAME

(71) Applicant: NINGBO WEIE ELECTRONICS TECHNOLOGY LTD., Ningbo (CN)

(72) Inventors: Feng Yu, Ningbo (CN); Weiyi Feng, Ningbo (CN); Lizhi Xu, Ningbo (CN)

(73) Assignee: NINGBO WEIE ELECTRONICS TECHNOLOGY LTD., Ningbo (CN)

( * ) Notice: Subject to any disclaimer, the term of this patent is extended or adjusted under 35 U.S.C. 154(b) by 167 days.

(21) Appl. No.: 16/818,454

(22) Filed: Mar. 13, 2020

(65) Prior Publication Data

US 2020/0303119 A1 Sep. 24, 2020

(30) Foreign Application Priority Data

Mar. 19, 2019 (CN) .......................... 201920352052.3

(51) Int. Cl.
| | | |
|---|---|---|
| H02J 7/00 | (2006.01) | |
| H01F 38/14 | (2006.01) | |
| H02J 7/02 | (2016.01) | |
| H02J 50/70 | (2016.01) | |
| H01F 27/28 | (2006.01) | |
| H02J 50/12 | (2016.01) | |
| H01F 27/36 | (2006.01) | |

(52) U.S. Cl.
CPC ............. *H01F 38/14* (2013.01); *H01F 27/28* (2013.01); *H01F 27/36* (2013.01); *H02J 7/02* (2013.01); *H02J 50/12* (2016.02); *H02J 50/70* (2016.02)

(58) Field of Classification Search
USPC .......................... 320/106, 107, 108, 109, 110
See application file for complete search history.

(56) References Cited

U.S. PATENT DOCUMENTS

| | | | | |
|---|---|---|---|---|
| 10,650,964 B2* | 5/2020 | Xu | ......................... | H02J 50/12 |
| 2012/0187903 A1* | 7/2012 | Tabata | .................... | H02J 50/70 |
| | | | | 320/108 |
| 2015/0054348 A1* | 2/2015 | Akiya | ...................... | H02J 50/10 |
| | | | | 307/104 |
| 2015/0364244 A1* | 12/2015 | Tsai | ........................ | H01F 27/36 |
| | | | | 336/200 |
| 2017/0323718 A1* | 11/2017 | Foley | .................. | H01F 27/2871 |
| 2019/0198239 A1* | 6/2019 | Xu | .......................... | H01F 38/14 |

(Continued)

FOREIGN PATENT DOCUMENTS

| | | | | |
|---|---|---|---|---|
| CN | 103858307 B | * | 7/2012 | |
| CN | 104854757 B | * | 4/2018 | ............... H01Q 7/00 |
| CN | 207925287 | | 9/2018 | |

(Continued)

*Primary Examiner* — Brian Ngo
(74) *Attorney, Agent, or Firm* — Andrus Intellectual Property Law, LLP

(57) ABSTRACT

A coil module and a wireless power transmitting circuit using the same are disclosed. At least three sets of coils are configured to be connected in series and overlapped each other, which may, in one hand, increase the coupling coefficient between the power transmitting coil and the power receiving coil, and in the other hand, make the alternating magnetic field generated by the coil module more concentrated so as to reduce negative influences caused by the strayed magnetic field around the coil module.

14 Claims, 4 Drawing Sheets

(56) References Cited

U.S. PATENT DOCUMENTS

2020/0036229 A1\* 1/2020 Pinciuc .................. H02J 7/007
2020/0303119 A1\* 9/2020 Yu ........................... H01F 27/38

FOREIGN PATENT DOCUMENTS

JP           3226466 U  \*  7/2020  ............. H01F 38/14
KR        101072605 B1 \* 10/2011
KR       20130098828 A  \*  3/2012

\* cited by examiner

COIL MODULE AND WIRELESS POWER TRANSMITTING CIRCUIT USING THE SAME

CROSS-REFERENCE TO RELATED APPLICATIONS

The present application claims the priority of the Chinese application No. 201920352052.3 with the title of "COIL MODULE AND WIRELESS POWER TRANSMITTING CIRCUIT USING THE SAME" filed on Mar. 19, 2019, the entire contents of which are incorporated herein by reference.

TECHNICAL FIELD

The present disclosure relates to the field of wireless charging technology, and more particularly, to a coil module and a wireless power transmitting circuit using the same.

BACKGROUND

Wireless charging technology can wirelessly transmit power between electronic devices. A wireless power transmitting terminal converts a direct current into an alternating current that generates an alternating magnetic field through the coil in the wireless power transmitting terminal. A wireless power receiving terminal couples to the alternating magnetic field to induce a corresponding alternating voltage that is then converted into a direct current voltage by a rectifying circuit to charge an electronic device. With the development of wireless charging technology, the demands for increasing wireless charging distance is getting higher and higher.

The existing technology usually increases induced voltage at the wireless power receiving terminal by increasing coupling inductance through the increase of the turns of the coil in the same plane, thereby increases the wireless charging distance.

However, increasing the turns of the coil in the same plane will make the coil wound larger and larger, and make the magnetic field around the coil more divergent in space. The strayed spatial magnetic field around the power receiving coil will bring negative influences, such as heating the metal foreign bodies (such as batteries, circuit boards, etc.) around the receiving coil in mobile phones, which will cause additional loss and reduce charging efficiency.

SUMMARY

In view of this, the present disclosure provides a coil module and a wireless power transmitting circuit using the same so as to make the alternating magnetic field generated by the coil module more concentrated and reduce the negative influences caused by the strayed magnetic field around the coil module.

In a first aspect of the present disclosure, a coil module used as a transmitting coil for wireless charging is provided, wherein the coil module comprises:

multiple sets of coils connected in series and overlapped each other, wherein the coil module comprises at least three sets of coils.

In one embodiment, the outer diameter of wire turns of the coils is between 50 mm and 80 mm.

In one embodiment, the inner diameter of wire turns of the coils is greater than 5 mm.

In one embodiment, the coil is planarly wound, and the multiple sets of coils overlap each other along the axis of the coils.

In one embodiment, the wire turns of the coils are superposed in vertical direction, and the multiple sets of coils overlap each other along radial direction of the coils.

In one embodiment, the coil module further comprises:

a central magnetic column arranged at the center of the multiple sets of coils; and/or a magnetic sheet arranged at the bottom of the multiple sets of coils, wherein the outer diameter of the central magnetic column is less than or equal to the inner diameter of the wire turns of the coils.

In a second aspect of the present disclosure, a coil module used as a transmitting coil for wireless charging is provided, wherein the coil module comprises:

multiple sets of coils connected in series and overlapped each other, wherein the outer diameter of wire turns of the coils is between 50 mm and 80 mm.

In one embodiment, the inner diameter of wire turns of the coils is greater than 5 mm.

In one embodiment, the coil is planarly wound, and the multiple sets of coils overlap each other along the axis of the coils.

In one embodiment, the wire turns of the coils are superposed in vertical direction, and the multiple sets of coils overlap each other along radial direction of the coils.

In one embodiment, the coil module further comprises:

a central magnetic column arranged at the center of the multiple sets of coils; and/or a magnetic sheet arranged at the bottom of the multiple sets of coils, wherein the outer diameter of the central magnetic column is less than or equal to the inner diameter of the wire turns of the coils.

In a third aspect of the present disclosure, a wireless power transmitting circuit used for wireless charging is provided, wherein the wireless power transmitting circuit comprises the coil module as stated above.

According to preset disclosure, at least three sets of coils are configured to be connected in series and overlapped each other, which may, in one hand, increase the coupling coefficient between the power transmitting coil and the power receiving coil, and in the other hand, make the alternating magnetic field generated by the coil module more concentrated so as to reduce the negative influences caused by the strayed magnetic field around the coil module.

BRIEF DESCRIPTION OF THE DRAWINGS

The above and other objects, features and advantages of the present disclosure will become more apparent from the following description of the embodiments of the present disclosure with reference to the accompanying drawings in which.

DETAILED DESCRIPTION

Figure 1:
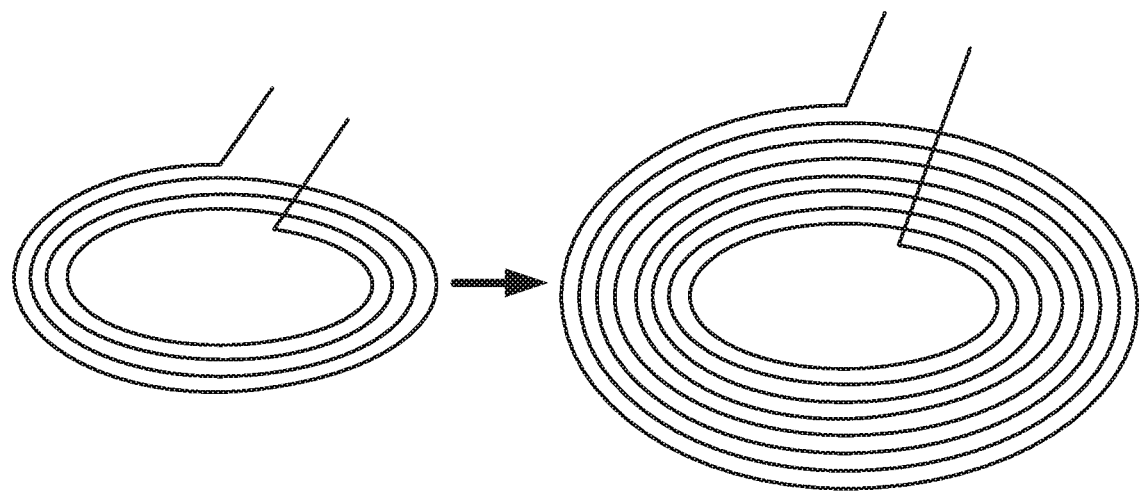
FIG. 1 is a schematic diagram showing the structure of a coil module of the prior art.

Hereinafter, the present disclosure will be described based on the embodiments.

However, the present disclosure is not limited to these embodiments. In the detailed description of the present disclosure hereinafter, some specific details will be described exhaustively. For those skilled in the art, the present disclosure may be thoroughly understood without description of these details. In order to avoid confusing the substance of the present disclosure, known methods, processes, flows, elements and circuits will not be described in detail.

In addition, those skilled in the art should understand the drawings provided here are for illustrative purposes, and the drawings are not necessarily drawn in proportion.

Meanwhile, it should be understood that in the following description, the term "circuit" refers to a conductive loop consisting of at least one component or sub-circuit which are electrically coupled or electromagnetically coupled to each other. When one component/circuit is referred to as being "connected to" another component, or one component/circuit is referred to as being "connected between" two nodes, it can be connected to or coupled to another component directly or with an intermediate component therebetween. The connection between two components can be physical or logical connection, or physical and logical connection. On the contrary, when one component is referred to as being "coupled directly to" or "connected directly to" another component, it means that there is no intermediate component between two components.

Unless explicitly required in the context, the terms "comprise" and "include" and like expressions in the entire description and claims should be interpreted as an inclusive meaning, not an exclusive or exhaustive meaning; in other words, they mean "comprise, but not limited to."

In the description of the present disclosure, it should be understood that the terms "first" and "second" and the like are only for descriptive purposes, and cannot be understood as indicating or implying relative importance. In addition, in the description of the present disclosure, unless otherwise indicated, the meaning of "plural" is two or above.

A wireless power transmitting terminal converts a direct current into an alternating current that generates an alternating magnetic field through the coil in the wireless power transmitting terminal. A wireless power receiving terminal couples to the alternating magnetic field to induce a corresponding alternating voltage that is then converted into a direct current voltage by a rectifying circuit to charge an electronic device. The induced voltage generated by the wireless power receiving terminal coupling to the alternating magnetic field is:

$$U_s = \omega M I_p \text{(wherein } M = k\sqrt{L_p L_s}\text{)}$$

where $\omega$ is the frequency of the alternating magnetic field, M is a coupling inductance between a power transmitting coil and a power receiving coil, $I_p$ is the current in the power transmitting coil which characterizes the intensity of the magnetic field, Lp is an inductance value of the power transmitting coil, Ls is an inductance value of the power receiving coil and k is a coupling coefficient between the power transmitting coil and the power receiving coil.

In the case that the charging distance is relatively long, for example, when a wireless charging device is arranged under a desktop to charge a device above the desktop, the use of a general power transmitting coil module will lead to a significant reduction in coupling inductance between the power transmitting coil and the power receiving coil, which will then lead to the failure to generate induced voltage as required at the power receiving terminal.

It can be known from the above equation that the induced voltage can be increased by increasing the frequency of alternating magnetic field, the coupling inductance between the power transmitting coil and power receiving coil and the current in the power transmitting coil, and thus the wireless charging distance is increased. However, changing the frequency of the alternating magnetic field may make the wireless charging equipment not work properly, and may even cause unpredictable loss. Changing the driving current of the power transmitting coil will increase the heating of the power transmitting coil and the index of the corresponding circuit components, which will greatly increase the cost. Therefore, in the present disclosure, it is considered to improve the induced voltage at the wireless power receiving terminal by increasing the coupling inductance M.

In the existing technology, it is usually expected to increase the degree of freedom of wireless charging while increasing the coupling inductance M. Therefore, it usually increases the coupling inductance M by increasing the number of the turns of the coil.

With the increase of the charging distance, the coupling coefficient k between the power transmitting coil and the power receiving coil decreases accordingly. Thus, the coupling inductance M can be increased by increasing the inductance value of the power transmitting coil, the inductance value of the power receiving coil or the coupling coefficient between the power transmitting coil and the power receiving coil.

The inductance value of the coil and the coupling coefficient can be increased by increasing the number of turns of the coil (the inductance value of the coil is in direct proportion to the square of the turns). According to the existing technology in the field of wireless charging, the inductance value of the coil and the coupling coefficient are usually increased by increasing the turns of the coil in the same plane so as to increase the wireless charging distance.

FIG. 1 is a schematic diagram showing the structure of the coil module of the prior art. As shown in FIG. 1, the number of turns of the coil is increased from 4 to 8 in the same plane. In this way, the number of turns is increased by 2 times and the inductance value is increased by nearly 4 times, which can thus increase the charging distance. However, increasing the turns of the coil in the same plane through planar winding method will make the coil wound larger and larger, and make the magnetic field around the coil more divergent in space. The strayed spatial magnetic field around the power receiving coil will bring negative influences, such as heating the metal foreign bodies (such as batteries, circuit boards, etc.) around the receiving coil in wireless charging devices, which will cause additional loss and reduce charging efficiency.

Figure 2:
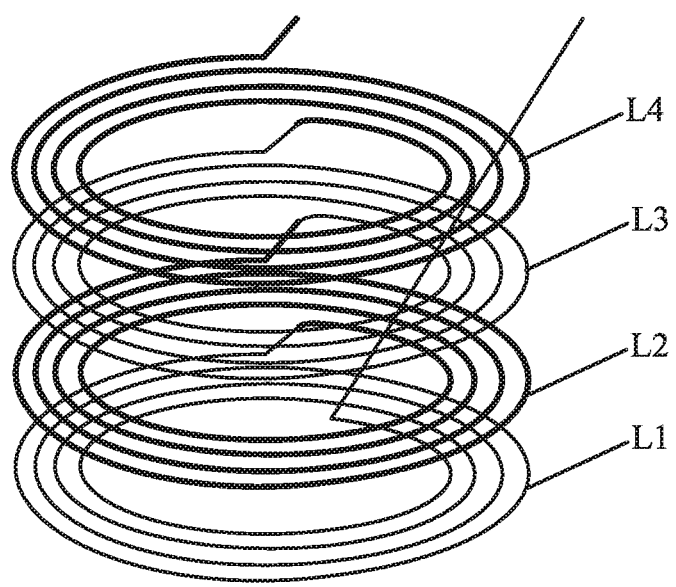
FIG. 2 is a schematic diagram showing the structure of a coil module according to a first embodiment of the present disclosure.

FIG. 2 is a schematic diagram showing the structure of a coil module according to a first embodiment of the present disclosure. As shown in FIG. 2, the coil module comprises multiple sets of oils overlapped each other. The multiple sets of coils are configured to be concentrically overlapped so that the induced voltages at parts of the upper coil are approximately equal to those at corresponding parts of the lower coil so as to reduce the loss. That is, the multiple sets of coils are arranged in parallel to form multiple superposed layers. Each set of coil is a single layer, and the centers of the multiple sets of coils are located in the same line that is perpendicular to the plane where each set of coil is located.

In one embodiment, the coil module includes three or more sets of coils. When there are two sets of coils, the number of turns of the coil being increased by 2 times makes the inductance increased by about 4 times. It usually cannot meet the practical requirements although the wireless power transmission distance is increased. Therefore, the coil module according to the present disclosure includes at least three sets of coils. It should be understood that, for some special application scenarios, a coil module with two sets of coils can also be used when the demands for the transmission distance is not high.

In this embodiment, a coil module including four sets of coils is illustrated as an example. Compared with a single set of coil, the inductance of four sets of overlap winding coils can be increased by 16 times. At the same time, compared with the way of increasing the number of turns of wires in the same plane, the magnetic field distribution in vertical direction is more concentrated by the way of adopting superposed layers when the same inductance is obtained, which reduces the heating of metal foreign bodies around the receiving coil in the mobile phone by the strayed spatial magnetic field and thus reduces the loss.

Specifically, the coil module includes coils L1, L2, L3 and L4. The multi-layer coil in FIG. 2 adopts lines with different thickness to distinguish perspective layer of the coil. It should be understood that the multiple set of coils are wound with the same wire. In practice, the thickness of the coil in each layer is the same. The winding method is as follows: firstly, the wire is wound gradually from the inner diameter to the outer diameter in the same plane to form the coil L1 after 4 turns of the wire are wound; then the wire is extended to a plane above the coil L1 and wound gradually from the inner diameter to the outer diameter to form the coil L2 after 4 turns of the wire are wound; then the wire is extended to a plane above the coil L2 and wound gradually from the inner diameter to the outer diameter to form the coil L3 after 4 turns of the wire are wound; and finally, the wire is extended to a plane above the coil L3 and wound gradually from the inner diameter to the outer diameter to form the coil L4 after 4 turns of the wire are wound, and thus the coil module as shown in FIG. 2 is obtained.

In the present embodiment, the size of the built-in power receiving coil of the wireless charging device is usually about 50 mm×50 mm. In order to realize charging at a distance of 30 mm to 40 mm, the outer diameter of the wire turns of the multiple sets of coils is preferably between 50 mm and 80 mm. If the outer diameter of the wire turns of the power transmitting coil is too large (>80 mm), the strayed spatial magnetic field around the power receiving coil will be increased, which will bring negative influences, such as heating the metal foreign bodies (such as batteries, circuit boards, etc.) around the receiving coil in mobile phones, which will cause additional loss and reduce charging efficiency. If the outer diameter of the wire turns of the power transmitting coil is too small (<50 mm), the coupling inductance is not easy to be increased, and the induced voltage is not easy to be generated by the power receiving coil locating in a distance of more than 30 mm.

In the present embodiment, the inner diameter of the wire turns of the multi-layer overlap winding transmitting coil is set to be more than 5 mm, which makes the coil provide magnetic field in a vertical distance of more than 30 mm.

In one embodiment, the inner diameter of the wire turns of the multi-layer overlap winding transmitting coil is set to be more than 20 mm. If the inner diameter of the wire turns is too small (<20 mm), several turns of the wire at the center will not provide magnetic field in a vertical distance of more than 30 mm. At the same time, the concentration of the magnetic fields at the center of the coils will also increase alternating current loss of the wire.

In the present embodiment, the wire can adopt 0.08×105 litz wire used as A11 coil wire material that meets Qi standard. However, the proximity effect between layers increases for multi-layer wire overlapping. In order to reduce wire loss, a thicker material, such as 0.1×100 litz wire, 0.08×120 litz wire or 0.08×150 litz wire, is preferred, as compared with standard A11 coil wire.

Specifically, Qi is a "wireless charging" standard launched by Wireless Power Consortium with two characteristics: convenience and universality. First of all, products of different brands can be charged with a Qi wireless charger as long as they have a Qi identification. Secondly, it overcomes the technical bottleneck of "universality" in wireless charging. In the near future, mobile phones, cameras, computers and other products can be charged with Qi wireless chargers, which provides the possibility for the large-scale application of wireless charging.

At the same time, in order to make the spatial magnetic field generated in the vertical direction by the multi-layer overlap winding coil as shown in FIG. 2 more concentrated, a cylindrical magnetic column can be added in the inner diameter area of the wire turns.

Figure 3:
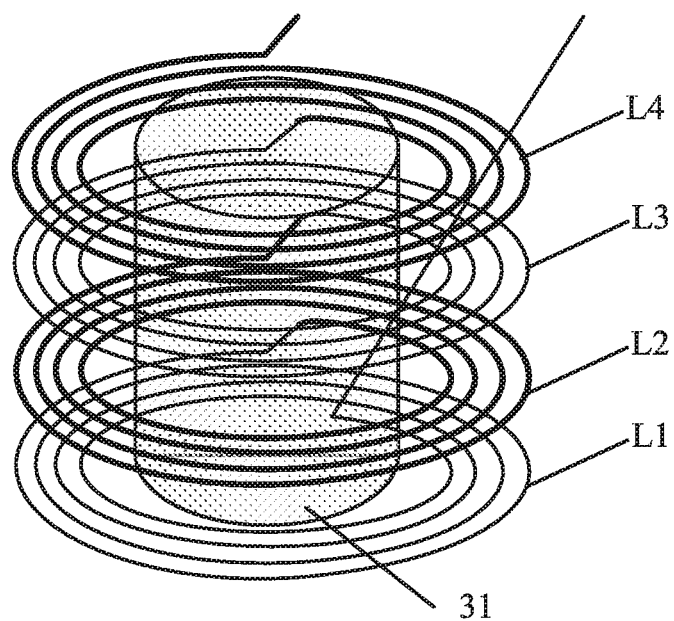
FIG. 3 is a schematic diagram showing the structure of a coil module according to a second embodiment of the present disclosure.

FIG. 3 is a schematic diagram showing the structure of a coil module according to a second embodiment of the present disclosure. As shown in FIG. 3, the coil module includes coils L1, L2, L3 and L4, and a magnetic column 31.

In the present embodiment, the magnetic column 31 is a cylinder made of a magnetic material. Specifically, the outer diameter of the magnetic column is less than or equal to the inner diameter of the coil.

As a result, the spatial magnetic field generated by the multi-layer overlap winding coil in the vertical direction is more concentrated by adding a magnetic columns in the multiple sets of coils, which can reduce the negative influences caused by the strayed magnetic field.

At the same time, a magnetic sheet can be added at the bottom of multiple sets of coils to increase the inductance value of the power transmitting coil.

Figure 4:
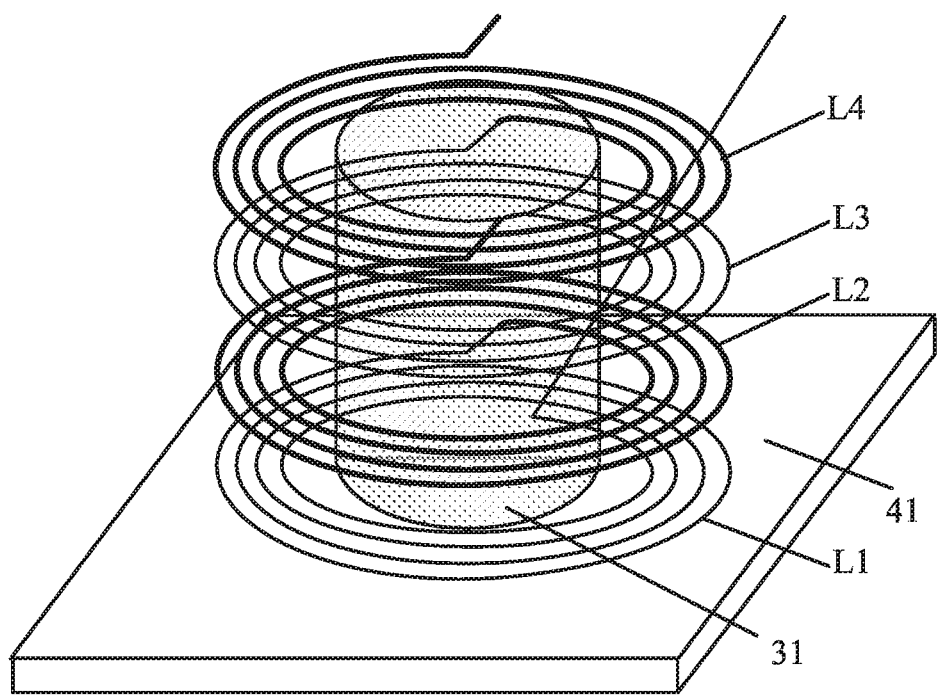
FIG. 4 is a schematic diagram showing the structure of a coil module according to a third embodiment of the present disclosure.

FIG. 4 is a schematic diagram showing the structure of a coil module according to a third embodiment of the present disclosure. As shown in FIG. 4, the coil module includes coils L1, L2, L3 and L4, a magnetic column 31 and a magnetic sheet 41.

In the present embodiment, the magnetic column 31 is a cylinder made of a magnetic material. Specifically, the outer diameter of the magnetic column is less than or equal to the inner diameter of the coil. As a result, the spatial magnetic field generated in the vertical direction by the multi-layer overlap winding coil is more concentrated by adding a magnetic column in the multiple sets of coils, which can reduce the negative influences caused by the strayed magnetic field.

In the present embodiment, the magnetic sheet 41 can further increase the inductance value of the power transmitting coil, thereby increase the coupling inductance between the power transmitting coil and the power receiving coil, which then can increase wireless power transmission distance.

It should be understood that the coil module as shown in FIG. 4 is added with a magnetic sheet after being added with a magnetic column. However, it can also only add a magnetic sheet to the coil module as shown in FIG. 2 to increase the inductance value of the power transmitting coil.

In the present embodiment, other winding methods can also be used to form coil module with four sets of coils. For example, a coil module as shown in FIG. 5 can also be formed by a vertical winding method.

Figure 5:
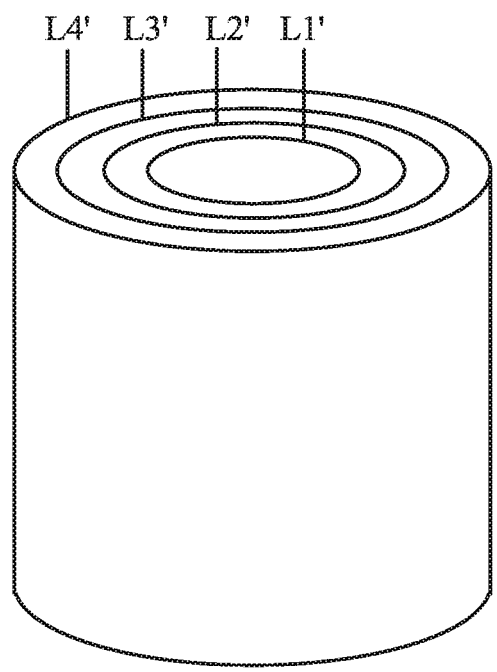
FIG. 5 is a schematic diagram showing the structure of a coil module according to a fourth embodiment of the present disclosure.

FIG. 5 is a schematic diagram showing the structure of a coil module according to a fourth embodiment of the present disclosure. As shown in FIG. 5, the wire turns of the multiple sets of coils are superposed in the vertical direction. From the axis of the coil (from top to bottom or from bottom to top), the coil module can be divided into four sets of coils. The diameters of coils L1', L2', L3' and L4' are from small to large, and the four sets of coils are connected in series. There are many ways to achieve connection in series, either the upper ends of two adjacent coils are connected or the upper end of a coil is connected with the lower end of an adjacent coil. Non-adjacent coils can also be interconnected, for example, coils L1' and L3' are connected in series, and coils L2' and L4' are connected in series. At the same time, the number of turns of coils L1, L2, L3 and L4 is the same, and the wire turns corresponding to each coil are in the same plane. Thus, the respective wire turns of the multiple sets of coils overlap each other along the radial direction of the coils, so that the coil module has multiple layers in the radial direction. The present embodiment takes four layers as an example. It should be understood that the appropriate number of layers can be selected according to the practical requirements.

Based on the structure of the coil module as stated above, one of the winding methods can be:

First, the wire is wound in the first layer to form the first turn of the coil L1' and then extended to the plane of the second layer and wound to form the second turn of the coil L1', and then extended to the plane of the third layer and wound to form the third turn of the coil L1', and then extended to the plane of the fourth layer and finally wound to form the fourth turn of the coil L1', which thus forms the coil L1'. Secondly, the end of the wire of the coil L1' is wound in the plane of the fourth layer to form the fourth turn of the coil L2', and then extended to the plane of the third layer and wound to form the third turn of the coil L2', and then extended to the plane of the second layer and wound to form the second turn of the coil L2', and then extended to the plane of the first layer and finally wound to form the first turn of the coil L2', which thus forms the coil L2'. Then, based on the same method as stated above, coils L3' and L4' are continued to be wound.

Although the structure of the coil module that is wound as stated above is not exactly the same as that as shown in FIG. 2, it has the same number of turns and sets of coils. Therefore, the magnetic field formed in space is also the same.

It should be understood that a coil module including four sets of coils can also be formed by the way of combining the planar winding method and the vertical winding method.

At the same time, a magnetic column and/or a magnetic sheet can be added to the coil module as shown in FIG. 5 to increase the inductance value of the power transmitting coil, so that the spatial magnetic field generated in the vertical direction by the multi-layer overlap winding coil can be more concentrated.

At the same time, according to the present disclosure, parasitic current caused by parasitic capacitance between coils can be effectively reduced by setting a capacitance, which can improve charging efficiency.

Specifically, in any of the coil modules as shown in FIGS. 2-5, a capacitance can be set between every two adjacent coils to make the capacitance resonate with its corresponding coil near the working frequency so as to improve the power transmission efficiency.

According to preset disclosure, at least three sets of coils are configured to be connected in series and overlapped each other, which may, in one hand, increase the coupling coefficient between the power transmitting coil and the power receiving coil, and in the other hand, make the alternating magnetic field generated by the coil module more concentrated so as to reduce the negative influences caused by the strayed magnetic field around the coil module.

It should be understood that the coil module according to the embodiment of the present disclosure is used as power transmitting coil with corresponding specifications designed according to the size of the built-in power receiving coil of current wireless charging device to increase wireless power transmission distance, which is mainly used in the wireless transmitting circuit. In some special occasions, it can also be designed as a power receiving coil that is used in wireless charging equipment.

Figure 6:
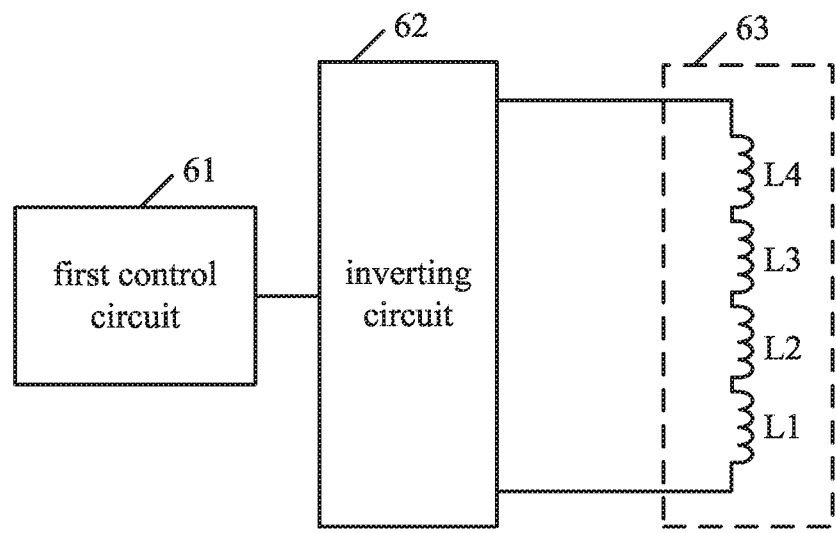
FIG. 6 is a circuit diagram of a wireless power transmitting circuit according to an embodiment of the present disclosure.

FIG. 6 is a circuit diagram of a wireless power transmitting circuit according to an embodiment of the present disclosure. As shown in FIG. 6, the wireless power transmitting circuit includes a first control circuit 61, an inverting circuit 62 and a coil module 63. The inverting circuit 62 is configured to convert the input direct current into alternating current of corresponding frequency, and the first control circuit 61 is configured to control the inverting circuit 62.

The coil module 63 includes coils L1, L2, L3 and L4, and the multiple sets of oils overlap each other. The wire turns of the coils are superposed in vertical direction and the multiple sets of coils overlap each other along the radial direction of the coils. The multiple sets of coils are configured to be concentrically overlapped so that the induced voltages at parts of the upper coil are approximately equal to those at corresponding parts of the lower coil so as to reduce the loss. That is, the multiple sets of coils are arranged in parallel to form multiple superposed layers. Each set of coil is a single layer, and the centers of the multiple sets of coils are located in the same line that is perpendicular to the plane where each set of coil is located.

Thus, multiple sets coils are configured to be connected in series and overlapped each other to increase the coupling coefficient between the power transmitting coil and the power receiving coil, which can make the alternating magnetic field generated by the coil module more concentrated so as to reduce the negative influences caused by the strayed magnetic field around the coil module.

Figure 7:
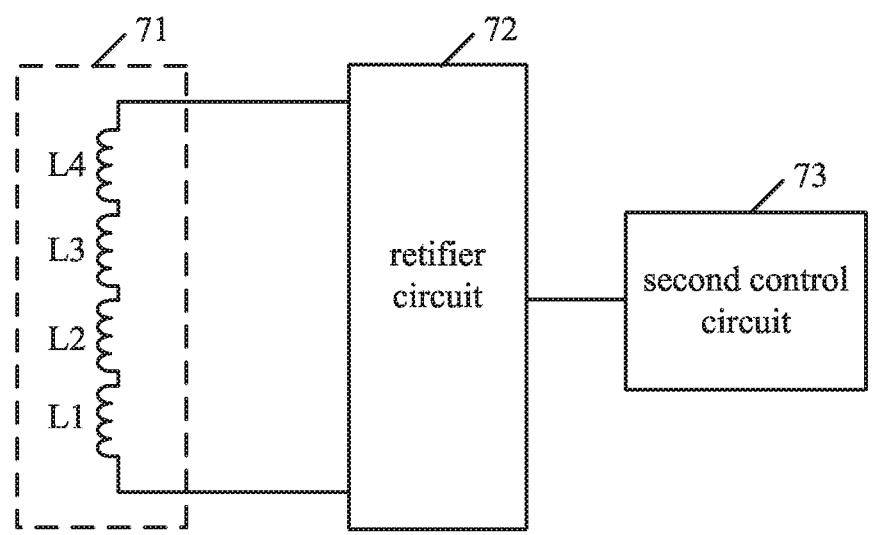
FIG. 7 is a circuit diagram of a wireless power receiving circuit according to an embodiment of the present disclosure.

FIG. 7 is a circuit diagram of a wireless power receiving circuit according to an embodiment of the present disclosure. As shown in FIG. 7, a wireless power receiving circuit includes a coil module 71, a rectifying circuit 72 and a second control circuit 73. The coil module 71 is configured to receive the power transmitted by the wireless power transmitting circuit, the rectifying circuit 72 is configured to convert the received alternating current to direct current and the second control circuit 73 is configured to control the rectifying circuit 72.

The coil module 71 includes coils L1, L2, L3 and L4, and the multiple sets of oils overlap each other. The wire turns of the coils are superposed in vertical direction and the multiple sets of coils overlap each other along the radial direction of the coils. The multiple sets of coils are configured to be concentrically overlapped so that the induced voltages at parts of the upper coil are approximately equal to those at corresponding parts of the lower coil so as to reduce the loss. That is, the multiple sets of coils are arranged in parallel to form multiple superposed layers. Each set of coil is a single layer, and the centers of the multiple sets of coils are located in the same line that is perpendicular to the plane where each set of coil is located Thus, multiple sets coils are configured to be connected in series and overlapped each other to increase the coupling coefficient between the power transmitting coil and the power receiving coil, which can increase the wireless power transmission distance.

According to the present disclosure, multiple sets coils are configured to be connected in series and overlapped each other and are limited in an appropriate size range according to the power receiving coils built in the wireless charging equipment. According to the present disclosure, the coupling coefficient between the power transmitting coil and the power receiving coil can be increased, which makes the alternating magnetic field generated by the coil module more concentrated so as to reduce the negative influence caused by the strayed magnetic field around the coil module.

What are described above are only some embodiments of the present disclosure and are not intended to limit the present disclosure. The present disclosure may have various alternations and changes for those skilled in the art. Any modifications, equivalent replacements and improvements made within the spirit and principle of the present disclosure should be included within the protection scope of the present disclosure.

The invention claimed is:

1. A coil module used as a transmitting coil for wireless charging, wherein the coil module comprises:
   multiple sets of coils connected in series and overlapped each other,
   wherein the coil module comprises at least three sets of coils, and each of the coils comprises an outer edge and an inner edge;
   wherein the multiple sets of coils are wound with a same wire from the outer edge to the inner edge of each along a same clockwise direction;
   wherein the at least three sets of coils comprise a first coil, a second coil, and a third coil, the first coil is attached to an upper surface of the second coil, and the third coil is attached to a lower surface of the second coil.

2. The coil module according to claim 1, wherein the outer diameter of wire turns of the coils is between 50 mm and 80 mm.

3. The coil module according to claim 1, wherein the inner diameter of wire turns of the coils is greater than 5 mm.

4. The coil module according to claim 1, wherein the coil is planarly wound, and the multiple sets of coils overlap each other along the axis of the coils.

5. The coil module according to claim 1, wherein the coil module further comprises:
   a central magnetic column arranged at the center of the multiple sets of coils; and/or
   a magnetic sheet arranged at the bottom of the multiple sets of coils,
   wherein the outer diameter of the central magnetic column is less than or equal to the inner diameter of wire turns of the coils.

6. The coil module according to claim 1, wherein the multiple sets of coils are wound with at least one of following wires:
   a 0.08×105 litz wire, a 0.1×100 litz wire, a 0.08×120 litz wire or a 0.08×150 litz wire.

7. A coil module used as a transmitting coil for wireless charging, wherein the coil module comprises:
   multiple sets of coils connected in series and overlapped each other,
   wherein the outer diameter of wire turns of the coils is between 50 mm and 80 mm;
   wherein each of the coils comprises an outer edge and an inner edge, and the multiple sets of coils are wound with a same wire from the outer edge to the inner edge of each along a same clockwise direction;
   wherein the at least three sets of coils comprise a first coil, a second coil, and a third coil, the first coil is attached to an upper surface of the second coil, and the third coil is attached to a lower surface of the second coil.

8. The coil module according to claim 7, wherein the inner diameter of wire turns of the coils is greater than 5 mm.

9. The coil module according to claim 7, wherein the coil is planarly wound, and the multiple sets of coils overlap each other along the axis of the coils.

10. The coil module according to claim 7, wherein the coil module further comprises:
    a central magnetic column arranged at the center of the multiple sets of coils; and/or
    a magnetic sheet arranged at the bottom of the multiple sets of coils,
    wherein the outer diameter of the central magnetic column is less than or equal to the inner diameter of wire turns of the coils.

11. A wireless power transmitting circuit used for wireless charging, wherein the wireless power transmitting circuit comprises the coil module according to claim 1.

12. The coil module according to claim 1, wherein the coil module further comprises:
    multiple capacitors;
    wherein each of the multiple capacitors is set between two adjacent coils and is configured to resonate with the corresponding coils near the working frequency.

13. The coil module according to claim 7, wherein the coil module further comprises:
    multiple capacitors;
    wherein each of the multiple capacitors is set between two adjacent coils and is configured to resonate with the corresponding coils near the working frequency.

14. The coil module according to claim 7, wherein the multiple sets of coils are wound with at least one of following wires:
    a 0.08×105 litz wire, a 0.1×100 litz wire, a 0.08×120 litz wire or a 0.08×150 litz wire.

* * * * *